March 19, 1946.    G. L. GUTHRIE    2,396,916
WEIGHING DEVICE
Filed Oct. 6, 1943

GEORGE L. GUTHRIE,
INVENTOR.

BY

ATTORNEY.

Patented Mar. 19, 1946

2,396,916

UNITED STATES PATENT OFFICE 2,396,916

WEIGHING DEVICE

George L. Guthrie, Balboa Island, Calif.

Application October 6, 1943, Serial No. 505,155

14 Claims. (Cl. 73—141)

This invention relates to a new and novel weight-indicating and recording device which utilizes the stress-strain relation or the modulus of elasticity in compression of various metals, alloys and other isotropic materials as a means of determining the true weight or load imposed upon the device. More specifically, the invention pertains to a weight indicator particularly adapted for use on pumping wells. The device is of great value in determining proper counterbalance for pumping wells, to determine the horsepower requirements of a pumping well, to make the rod stress and rate of change of stress on the rods a minimum, to determine power required to lift the load, to determine the efficiency of the pump, and many other factors.

Devices capable of sustaining and measuring heavy loads, say loads of between 10,000 pounds and 300,000 pounds, are generally extremely large, bulky and inaccurate. A great deal of difficulty has been encountered in calibrating such devices. Some attempts have been made to determine heavy loads by electrical methods and devices but these are extremely delicate, fragile and incapable of being used in exposed positions or subject to rough handling.

The present invention is based upon the discovery that the stress-strain relations in compression of various ferrous and non-ferrous metals, alloys and other isotropic materials may be utilized in determining a load or weight. It has been found that if a block or cylinder of steel, for example (hereafter referred to as the reactive cylinder) is subjected to a load and the reactive cylinder is of such cross-sectional area that the load imposed thereon does not exceed the proportional limits of the steel, the resultant strains upon the reactive cylinder may be used in indicating or recording the weight imposed upon the reactive cylinder. Any suitable type of mechanical or electrical linkage may connect the indicating or recording device with the reactive cylinder, the mechanical (or hydraulic) linkage being used simply for the purpose of magnifying the compression strain. The invention permits ready calibration to a uniformly graduated scale, the stress-strain relation, in compression, being a straight line function of the stress imposed upon the reactive cylinder.

The invention, furthermore, contemplates the control of the effective load-bearing range of the device by varying the proportional limit factor of the reactive cylinder. This can be done while maintaining the same unit strain per unit of load so that a dial uniformly graduated for one load range may be used for an entirely different load range by simply changing the reactive cylinder.

An object of the present invention, therefore, is to disclose and provide a new and novel method of measuring loads.

Another object of the invention is to disclose a method of determining loads, stresses or weights by means of the stress-strain relation, in compression, of a reactive cylinder or block.

A further object of the invention is to disclose and provide a weighing device which is easily calibrated, is of simple construction, and which is extremely rugged in character.

A further object of the invention is to disclose and provide a weighing device particularly adapted for use on pumping wells.

These and other objects, advantages, modifications and adaptations of the invention will become apparent to those skilled in this art from the following detailed description of certain exemplary forms in which the method of the invention may be carried out. More specifically, in the appended drawing.

As previously stated, it is highly desirable to accurately measure and obtain a permanent record of polish rod loads on pumping wells. From the records obtained, pumping troubles are easily isolated because the load at every point of the stroke is known or indicated. From these weights or records, horse-power efficiencies, plunger travel and data as to whether the pump is pumping too fast or too slow or with too long or too short a stroke, etc., may be readily determined. Improved power consumption and decreased upkeep of pumping equipment follow from a proper use of such records.

Inasmuch as extremely high loads are sometimes encountered, prior forms of weight-recording and indicating devices have not been particularly successful. Some devices have employed a collapsible chamber or diaphragm filled with fluid, the load being imposed upon the diaphragm and thus generating an extremely high pressure in the fluid, this fluid pressure being then conveyed to an indicating or recording device.

In this prior type of device the load was actually supported by an enclosed body of fluid. It is extremely difficult to control fluid under such very high pressures. In the device of the present invention, the load being weighed is actually supported by a reactive cylinder or block of metal and in the event an hydraulic linkage is used, the hydraulic linkage does not carry the polish rod load but instead acts as a simple lever, only a very few pounds pressure being generated in this hydraulic fluid. As a result, no part of the weighing device except the reactive cylinder is subjected to very high loads and relatively sensitive, accurate displacement devices responsive to forces measurable in ounces and calibrated in terms of pounds or tons will accurately indicate or record the total load carried by the polish rod.

Figure 1:
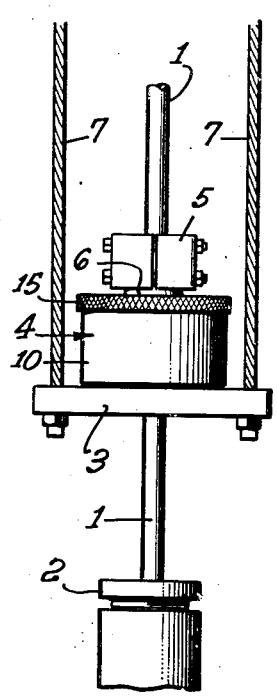
Fig. 1 is a front view of the device mounted upon a carrier bar for use in determining the varying loads to which a deep well pump is subjected in a pumping well.
Figure 2:
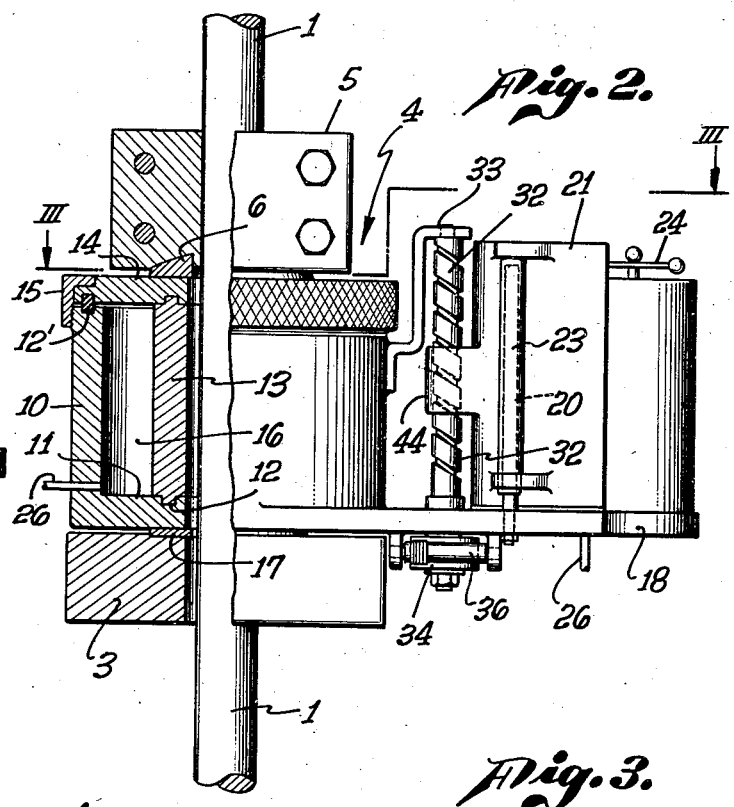
Fig. 2 is a side elevation, partly in section, of the device shown in Fig. 1.
Figure 4:
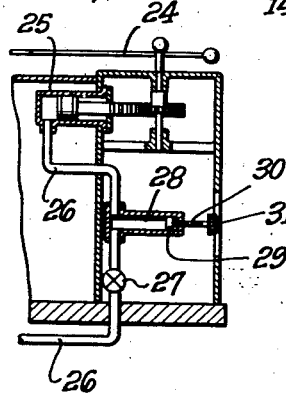
Fig. 4 is a vertical section of the front or indicating portion of the device shown in Figs. 2 and 3.

In the exemplary embodiment illustrated in Figs. 1 and 2, the polish rod 1 is shown extending through an ordinary stuffing box 2 and through a hole in the carrier bar 3. The device of the present invention is generally indicated at 4 and is supported by the carrier bar. The upper portion of the polish rod 1 is provided with the customary polish rod clamp 5, a bearing ring 6 being interposed between the device 4 and the polish rod clamp 5. The carrier bar 3 is connected as by means of the cables 7 to the horse head of the pumping rig. As the carrier bar is lifted, the device 4 bears against the bottom of the polish rod clamp 5 and since this clamp is attached to the polish rod, the polish rod is pulled up. During such up-stroke, the weight supported by the polish rod may be readily determined at every point of the upward travel. During the downward travel, a similar reading can be made.

Fig. 2 more clearly illustrates the construction of the device. In the form there shown, the weighing device 4 consists of a circular outer member 10 which may be integral with the bottom 11. The bottom 11 is provided with a centrally disposed aperture through which the polish rod 1 may extend. The inner surface of the bottom member 11, adjacent the central aperture, may be provided with a circular seating groove 12 adapted to receive a circular flange formed in the bottom of the reactive cylinder 13. The upper end of the reactive cylinder 13 may be provided with a similar upstanding flange capable of being snugly received into a circular groove formed in the lower surface of the top 14 of the device. The cover 14 of the device may be movably held on the top of the housing as by means of an internally threaded collar 15 connected to the side 10, the collar being provided with an inwardly extending flange at its upper end. A liquid-tight joint should be formed between the cover 14 and the side 10 of the device, as by a compressible, resilient, elastic packing ring 12' but neither the side 10 nor the bottom or top members 11 and 14 need be sufficiently strong to support the total load. Metal to metal, load bearing contact between cover 14 and side 10 is not necessary and preferably does not exist.

The lower surface of the polish rod clamp 5 may be provided with a concave seat adapted to snugly rest upon a seating ring 6 which is positioned on the weighing device directly above the reaction cylinder 13. The seating ring 6 may vary in size and design, the object being to centralize the load and transmit the same directly from the polish rod clamp 5 into the upper end of the reaction cylinder 13.

Since the carrier bars 3 ordinarily employed in pumping oil wells are usually rough castings, Fig. 2 shows a circular, milled surface formed in the upper surface of the carrier bar 3, such milled surface being adapted to receive a seating ring 17 directly beneath and in vertical alignment with the reactive cylinder 13. In this manner, a smooth, flat, uniform distribution of the load is attained.

In the event the device is to be used not only for indicating weights or loads but also for recording the same, the device may be provided with an outwardly extending support 18 provided with vertical guides 19 and 20 along which a card holder 21 may move. The card holder 21 may be provided with tubular members 22 and 23 which are slidable upon the vertically extending guides 19 and 20. The card holder 21 may be semi-circular so as to permit the pivoted recording needle or scribe 24 to move along a card mounted upon the card holder and impart straight line characteristics to the record of the weight imposed upon the polish rod during a pumping cycle, which record is made on the card. The recording or indicating needle may be actuated in any suitable manner by a linkage associated with the annular chamber 16 surrounding the reactive cylinder 13 in the weighing device 4. For example, the index member 24 may be actuated through a pinion in engagement with a rack gear carried by a piston extending from cylinder 25 connected by means of conduit 26 with the annular chamber 16. The conduit 26 may include a shut-off valve 27 and a chamber 28 containing a piston 29 capable of being adjustably positioned within the chamber 28. The piston 29 may, for example, be carried by one end of a threaded shaft 30 passing through the end wall of the chamber 28, the threaded shaft 30 being capable of rotation as by means of the knurled knob 31.

Figure 3:
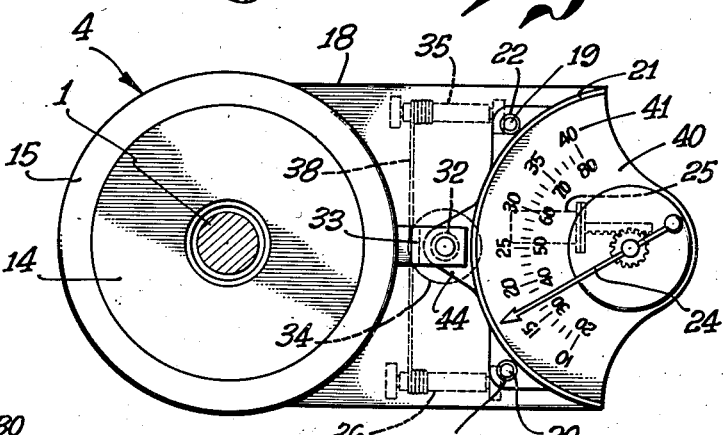
Fig. 3 is a plan view taken along the plane III—III of Fig. 2.

Vertical movement of the card holder 21 in timed relation with the stroke of the polish rod may be accomplished in a variety of ways. One of the simplest modes of obtaining such movement is illustrated in Figs. 2 and 3 and includes the vertical driving shaft 32 journaled in the support 18, the upper portion of the drive shaft 32 being suitably journaled in a bracket 33 attached to the outer housing of the device 4. The drive shaft 32 is provided with a spiral thread. A nut 44 is carried on the threaded drive shaft 32, the nut being attached to the card holder 21.

The lower end of the drive shaft 32 is shown extending below the support 18 and provided with a roller or pulley 34. Mounted on the lower surface of the support 18 is a reel or roller 35 which is preferably spring wound or provided with spring means for maintaining the same under tension at all times. Another roller 36 is journaled on the other side of the pulley 34 for free rotation. A suitable length of relatively non-stretchable flexible string or line is carried by the spring-wound roller 35, then passes around the pulley 34 one or more times, and then around the free roller 36. This line 38 may be partly unwound from the spring-wound roller 35 and its free end then attached to some stationary object beneath the lowest point of travel of the carrier bar 3, such as, for example, a point adjacent the stuffing box 2. As the carrier bar and the device 4 move up and down, the line will be maintained under tension by the spring-wound roller 35 and will impart a suitable rotation to the drive shaft 32.

The drive shaft may be rotated in a direction adapted to raise the card holder 21 during the down stroke of the polish rod and to lower the card holder during the up stroke of the polish rod, or vice versa, depending upon the type of card record desired. It is to be understood, however, that other means of imparting movement of the card holder in timed relation to the stroke of the polish rod may be used instead of the specific form of drive herein described.

In the event a load is imposed upon the reactive cylinder 13, the material of such cylinder will be compressed or shortened. Concurrently with such shortening, a lateral strain is obtained, causing an outward expansion of the cylinder in a direction perpendicular to the direction of stress. The lateral strain is directly proportional to the vertical strain. Since chamber 16, conduit 26, cylinder 28 and cylinder 25 are filled with a suitable, incompressible fluid or oil, and side wall 10, bottom 11 and top 14 are not distorted or compressed by the load, the vertical and lateral strains of the reactive cylinder cause the fluid to displace the piston in cylinder 25. The rack carried by such piston imparts movement to the pinion mounted upon the pivot pin of index 24 and to such index.

It will be noted that top 14 moves with and responds to the vertical strain of the reactive cylinder. Multiplication of such vertical strain may be attained by increasing the size or area of the top 14 in contact with the fluid in chamber 16. The sensitivity of the device may be thus increased or decreased by varying the size of top 14. The size of cylinder 25 also affects sensitivity, as will be apparent to those skilled in the art.

The load bearing range of the device depends upon the characteristics of the reactive cylinder 13. The reactive cylinder 13 carries the full load and should be capable of supporting that load as well as any shock loads which might be encountered during the operation, without permanent deformation or failure. One of the factors to be considered in selecting and designing the reactive cylinder 13 is the proportional limit of the steel or alloy from which such reactive cylinder is made. By the term "proportional limit," reference is made to that maximum load in pounds per square inch above which the steel or alloy departs from a substantially straight line stress-strain relationship. The proportional limit of steels may vary from 20,000 p. s. i. to about 100,000 p. s. i. Various aluminum alloys will show a proportional limit of between about 18,000 p. s. i. and 36,000 p. s. i.

Another factor to be considered is the elastic limit of the metal or alloy from which the reactive cylinder is made. The properties of various steels including carbon, silica and manganese steels under compression, will be found to be substantially uniform.

The modulus of elasticity under compression ranges ordinarily between 28,000,000 p. s. i. and 30,000,000 p. s. i., and the variation, in view of the very large figures involved, does not materially affect the accuracy of the instrument. The modulus of elasticity under compression for aluminum alloys is about 10,000,000 p. s. i. whereas copper alloys occupy a range in the vicinity of 15,000,000 p. s. i. These properties of material used in making the reactive cylinder can be readily and accurately determined by well known testing laboratory methods.

Knowing the maximum load which the device will be required to weigh, a reactive cylinder is formed having a wall thickness sufficient to impart a cross-sectional area to the reactive cylinder which will adequately support and withstand the load without exceeding the proportional limit. It is to be remembered that the proportional limit of steels may be varied greatly by annealing, normalizing and other heat treatment. If the device is to operate at a relatively low range, then the reactive cylinder may be made of aluminum alloy, copper alloy or other isotropic solids. In a specific case where a maximum load of 100 tons is expected, a reactive cylinder 4 inches high and having a total cross-sectional area of 4,995 square inches was employed. A steel containing 0.30% carbon, 0.94% manganese, 0.0012% phosphorus, 0.025% sulfur and 0.20% silica was employed. This steel has a proportional limit of 42,000 pounds p. s. i. and a modulus of elasticity of 29,300,000 p. s. i.

It will be found that the movement of the index member or scribe 24 is directly proportional to the load imposed upon the reactive cylinder. If, for example, a dial face 40 is provided beneath the index member 24, such dial face may be uniformly graduated and it will be found that a change in load from say 40 to 50 tons will cause a movement of the index finger the same distance as a change in load from say 80 to 90 tons. The graduations on the scale 40 may be calculated from the modulus of elasticity and Poisson's ratio of the reactive cylinder 13. All that is necessary to render the device readable in a different load range is to change the reactive cylinder. By the use of a steel cylinder of only one-half the cross sectional area for example, the thinner cylinder will be found effective in a lower range than the thicker cylinder, so that readings can be made on scale 41 of face 40.

By substituting an aluminum cylinder for a steel cylinder (dimensional factors being the same), it will be found that the displacement of fluid will be about three times greater for the same load. This is due to the fact that the modulus of elasticity (in compression) of aluminum is only ⅓ that of steel. Cylinders of glass, plastics, resins and many other materials may be used. The invention furthermore, contemplates the control of the effective maximum load range of the device by varying the proportional load limit factor of the reactive cylinder. The dimensions of the reactive cylinder may remain constant, but the proportional limit may be modified by heat treatment. This can be accomplished while retaining the same unit stress-strain relation so that a dial uniformly graduated for one load range may be used for a larger or smaller load range by changing the heat treatment of the reactive cylinder. Various load ranges, any desired sensitivity and any shock load condition may be provided for by suitable selection of material, wall thickness etc.

The device herein disclosed may be readily calibrated by being subjected to a known load or loads. Variations in temperature may be compensated by minor adjustments of knob 31, this increasing or decreasing the volume of cylinder 28.

The method herein disclosed may be utilized not only in the device illustrated but also in many other devices. The form of the device may vary with the use to which it is put. A device employing the methods herein taught may be used in weighing large castings and machinery supported by a crane or the like, or in determining the distribution of a load in an air transport vehicle.

All changes, modifications and adaptations coming within the scope of the appended claims are embraced thereby.

I claim:

1. In a load indicating device, the combination of: a housing provided with a removable closure and a centrally disposed port therethrough; a reaction cylinder within the housing, in contact with the bottom and closure thereof and concentric with respect to said port, said reaction cylinder being of a cross-sectional area adapted to support a predetermined maximum load without departing from a substantially straight line stress-strain relationship; means for applying a load concentrically around the port and to one end of the reaction cylinder; an annular chamber in the housing around said cylinder; a scale graduated in uniform units correlated to the modulus of elasticity in compression of the reaction cylinder; a movable index member in cooperative relation to the scale; means for moving the index member; and a liquid in the annular chamber and in communication with said moving means for translating the strain of the reaction cylinder under load into movement of the index member.

2. A device of the character stated in claim 1, wherein the closure is movable with respect to the housing in response to strain in the reaction cylinder but without flexure of the closure during such movement.

3. In a load indicating device, the combination of: a housing provided with a removable closure and a centrally disposed port therethrough; a reaction cylinder within the housing, in contact with the bottom and closure thereof and concentric with respect to said port, said reaction cylinder being of a cross-sectional area adapted to support a predetermined maximum load without departing from a substantially straight line stress-strain relationship; means for applying a load concentrically around the port and to one end of the reaction cylinder; an annular chamber in the housing around said cylinder; a scale graduated in uniform units correlated to the modulus of elasticity in compression of the reaction cylinder; a movable index member in cooperative relation to the scale; means for moving the index member; a card holder in proximity to the end of the index member; means for moving the card holder; and a liquid in the annular chamber and in communication with the means for moving the index member for translating the strain of the reaction cylinder under load into movement of the index member.

4. A device of the character stated in claim 3, provided with means for moving the card holder in proportion to the travel of the device.

5. A device of the character stated in claim 3, wherein the closure is movable with respect to the housing in response to strain in the reaction cylinder but without flexure of the closure during such movement.

6. In a load indicating device, the combination of: a housing provided with a removable fluid-tight closure and a centrally disposed port therethrough; a reaction cylinder within the housing, in contact with the bottom and closure thereof and concentric with respect to said port; said reaction cylinder being of a cross-sectional area adapted to support a predetermined maximum load without departing from a substantially straight line stress-strain relationship; said closure being movable with respect to said housing in response to strain in the reaction cylinder but without bending flexure during such movement; means for applying a load concentrically around the port and to one end of the reaction cylinder; an annular chamber in the housing around said cylinder, said annular chamber containing a body of liquid; a scale; a movable index member in cooperative relation to the scale; and means operated by the fluid in the annular chamber for translating the strain of the reaction cylinder under load into movement of the index member.

7. In a load indicating device, the combination of: a housing provided with a removable closure and a centrally disposed port therethrough; a reaction cylinder within the housing in contact with the bottom enclosure thereof and concentric with respect to said port, said reaction cylinder being of a cross-sectional area adapted to support a predetermined maximum load without departing from a substantially straight line stress-strain relationship; means for applying a load concentrically around the port and to one end of the reaction cylinder; an annular chamber in the housing around said reaction cylinder; a scale graduated in units correlated to the modulus of elasticity in compression of the reaction cylinder; a movable index member in cooperative relation to the scale; a cylinder provided with a movable piston, means connecting said piston and index member to translate motion of the piston into motion of the index member and a liquid in the annular chamber and in communication with one end of said cylinder and piston therein.

8. In a load indicating device: a housing provided with a removable fluid-tight closure; a centrally positioned reaction element within the housing and in contact with the bottom and closure thereof, said element being of a cross-sectional area adapted to support a predetermined maximum load without departing from a substantially straight line stress-strain relationship, said closure being movable with respect to said housing in response to strain in the reaction element but without bending flexure during such movement; means for applying a load to one end of the reaction element; an annular chamber in the housing around the reaction element, said chamber containing a body of liquid; a scale; a movable index member in cooperative relation to the scale and means operated by the fluid in the annular chamber for actuating the index member when the reaction element is under a load strain.

9. In a load indicating device: a housing provided with a removable fluid-tight closure; a centrally positioned reaction element within the housing and in contact with the bottom and closure thereof, said element being of a cross-sectional area adapted to support a predetermined maximum load without departing from a substantially straight line stress-strain relationship, said closure being movable with respect to said housing in response to strain in the reaction element but without bending flexure during such movement; means for applying a load to one end of the reaction element; an annular chamber in the housing around the reaction element, said chamber containing a body of liquid; a scale; a movable index member in cooperative relation to the scale; a cylinder provided with a movable piston, means connecting the piston and index member to translate motion of the piston into motion of the index member, and a conduit connecting said annular chamber and one end of said cylinder, said conduit being filled with liquid for actuating the index member when the reaction element is under a load strain.

10. In a load indicating device: a housing provided with a removable fluid-tight closure; a centrally positioned reaction element within the housing and in contact with the bottom and closure thereof, said element being of a cross-sectional area adapted to support a predetermined maximum load without departing from a substantially straight line stress-strain relationship, said closure being movable with respect to said housing in response to strain in the reaction element but without bending flexure during such movement; means for applying a load to one end of the reaction element; an annular chamber in the housing around the reaction element, said chamber containing a body of liquid; a scale; a movable index member in cooperative relation to the scale; a cylinder provided with a movable piston, means connecting the piston and index member to translate motion of the piston into motion of the index member, and a conduit connecting said annular chamber and one end of said cylinder, a chamber in said conduit, said chamber being provided with an adjustably positionable wall, said conduit, cylinder and chamber being filled with liquid for actuating the index member when the reaction element is under a load strain.

11. In a load indicating device: a housing provided with a removable fluid-tight closure; a reaction block in the housing and in contact with the bottom and closure of the housing, said block being adapted to sustain the maximum estimated load below the proportional limit of the material of the block; an annular chamber around the block; a movable index member; a body of liquid in said annular chamber and means operated by the liquid in the annular chamber for moving the index member in accordance with the strain of the material in the block under load.

12. In a load indicating device: a housing provided with a removable fluid-tight closure; a reaction block in the housing and in contact with the bottom and closure of the housing, said block being adapted to sustain the maximum estimated load below the proportional limit of the material of the block; an annular chamber around the block; a scale graduated in units correlated to the stress-strain relationship of the material of the block; a movable index member in cooperative relation to the scale; a body of liquid in said annular chamber and means operated by the liquid in the annular chamber for moving the index member in accordance with the lateral and vertical strain of the material in the block under load.

13. In a load indicating device: a housing provided with a removable fluid-tight closure; a reaction block in the housing and in contact with the bottom and closure of the housing, said block being adapted to sustain the maximum estimated load below the proportional limit of the material of the block; an annular chamber around the block; a movable index member; a body of liquid in said annular chamber and means operated by the liquid in the annular chamber for moving the index member in accordance with the lateral and vertical strain of the material in the block under load.

14. In a load indicating device: a housing provided with a removable fluid-tight closure; a reaction block in the housing and in contact with the bottom and closure of the housing, said block being adapted to sustain the maximum estimated load below the proportional limit of the material of the block; an annular chamber around the block; a movable index member; a cylinder provided with a movable piston, means connecting the piston and index member to translate the motion of the piston into motion of the index member and a conduit connecting the annular chamber and one end of said cylinder and a body of liquid in said annular chamber and conduit.

GEORGE L. GUTHRIE.